(12) United States Patent
Tsuzuki et al.

(10) Patent No.: US 8,695,772 B2
(45) Date of Patent: Apr. 15, 2014

(54) TORQUE CONVERTER APPARATUS

(75) Inventors: Yukihisa Tsuzuki, Kariya (JP); Yosuke Makino, Anjo (JP); Tomoko Yamamoto, Chiryu (JP); Tomoyuki Kitagawa, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 273 days.

(21) Appl. No.: 12/944,147

(22) Filed: Nov. 11, 2010

(65) Prior Publication Data
US 2011/0114432 A1    May 19, 2011

(30) Foreign Application Priority Data

Nov. 17, 2009   (JP) .................................. 2009-261702

(51) Int. Cl.
*F16D 33/08*   (2006.01)

(52) U.S. Cl.
USPC .................... 192/3.3; 192/213.2; 464/68.1

(58) Field of Classification Search
USPC ............ 192/213.22, 3.29, 3.3, 213.2, 213.21
See application file for complete search history.

(56) References Cited

U.S. PATENT DOCUMENTS

| | | | | |
|---|---|---|---|---|
| 5,307,710 A * | 5/1994 | Feldhaus et al. | ............ | 464/68.3 |
| 5,769,196 A * | 6/1998 | Murata | ........................ | 192/3.29 |
| 5,813,506 A * | 9/1998 | Maeda et al. | ................. | 192/3.29 |
| 6,047,804 A * | 4/2000 | Feldhaus et al. | ........... | 192/70.17 |
| 6,695,110 B2 * | 2/2004 | Maienschein et al. | ......... | 192/3.3 |
| 6,699,132 B2 * | 3/2004 | Friedmann et al. | .......... | 464/68.8 |
| 7,017,724 B2 * | 3/2006 | Hayabuchi et al. | ........ | 192/70.17 |
| 7,028,820 B2 | 4/2006 | Johann et al. | | |
| 2007/0007095 A1 * | 1/2007 | Tsukamoto et al. | ......... | 192/3.29 |
| 2009/0020385 A1 * | 1/2009 | Nakamura | .................... | 192/3.29 |
| 2009/0139816 A1 | 6/2009 | Degler et al. | | |
| 2011/0114433 A1 * | 5/2011 | Hattori et al. | ................ | 192/3.29 |

FOREIGN PATENT DOCUMENTS

| | | |
|---|---|---|
| JP | 2004-301327 A | 10/2004 |
| JP | 2009-515120 | 4/2009 |
| JP | 2009-222088 | 10/2009 |

OTHER PUBLICATIONS

History of Transmission (JatcoJR508E), Society of Automotive Engineering of Japan, Inc., Jun. 2008, 6 pages (discussed in specification).
Japanese Office Action issued on Jul. 2, 2013 by the Japan Patent Office in corresponding Japanese Patent Application No. 2009-261702, and English translation thereof.

* cited by examiner

*Primary Examiner* — David D Le
*Assistant Examiner* — Ryan Dodd
(74) *Attorney, Agent, or Firm* — Buchanan Ingersoll Rooney PC

(57) ABSTRACT

A torque converter apparatus includes a torque converter, a lock-up clutch arranged between the torque converter and an engine, and a lock-up damper arranged between the torque converter and the lock-up clutch and connected to the lock-up clutch, the lock-up damper including a plurality of springs arranged at multiple stages and separated from each other in a radial direction of the torque converter, the lock-up clutch including an outer hub and an inner hub, the outer hub extending toward the lock-up damper and supporting one of first and second frictional engagement members engageable with each other, the outer hub extending toward a first space formed between the plurality of springs in the radial direction, the inner hub extending toward the engine and supporting the other of the first and second frictional engagement members.

7 Claims, 1 Drawing Sheet

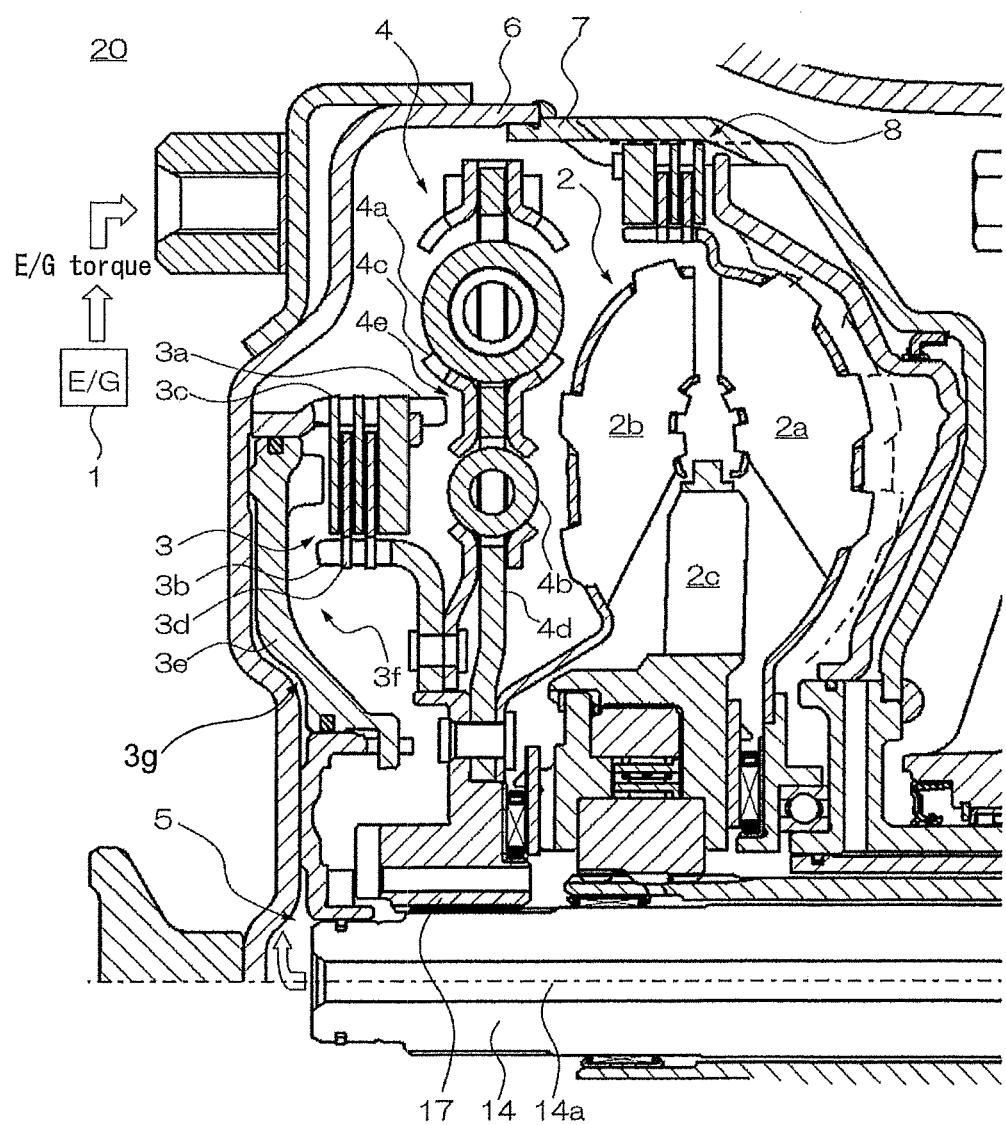

TORQUE CONVERTER APPARATUS

CROSS REFERENCE TO RELATED APPLICATIONS

This application is based on and claims priority under 35 U.S.C. §119 to Japanese Patent Application 2009-261702, filed on Nov. 17, 2009, the entire content of which is incorporated herein by reference.

TECHNICAL FIELD

This disclosure relates to a torque converter apparatus. In particular, the disclosure pertains to the torque converter apparatus including a lock-up clutch and a lock-up damper.

BACKGROUND DISCUSSION

A known torque converter apparatus disclosed in JP2004-301327A (hereinafter referred to as Reference 1) or the fifth report on History of Transmission (JatcoJR508E) published by Society of Automotive Engineering of Japan, Inc. (June, 2008) includes a bridging clutch serving as a lock-up clutch and a torsional vibration damper serving as a lock-up damper. The bridging clutch is arranged between an engine and an output element of the torque converter so as to mechanically transmit torque from the engine to a transmission. The torsional vibration damper functions to reduce muffled noise caused by vibrations of the engine.

The aforementioned bridging clutch includes an independent oil passage. A clutch engagement pressure is supplied to the bridging clutch through the independent oil passage. The bridging clutch includes a support portion serving as an outer hub supporting disks (frictional engagement members) and integrally rotating with a driving-side housing (front cover) of the torque converter apparatus.

The aforementioned torsional vibration damper does not include a plurality of springs arranged apart from one another in a radial direction of the torque converter.

In particular, the support portion described in Reference 1 is arranged at an outward side of the torsional vibration damper in the radial direction of the torque converter, therefore increasing the size of the torque converter in the radial direction and limiting the size of the torsional vibration damper in the radial direction. Accordingly, in a case where the torsional vibration damper includes the plurality of springs, the size of the torque converter apparatus in the radial direction is further increased and the size of the torsional vibration damper in the radial direction is further limited.

A need thus exists for a torque converter apparatus, which is not susceptible to the drawback mentioned above.

SUMMARY

According to an aspect of this disclosure, a torque converter apparatus includes a torque converter, a lock-up clutch arranged between the torque converter and an engine, and a lock-up damper arranged between the torque converter and the lock-up clutch and connected to the lock-up clutch, the lock-up damper including a plurality of springs arranged at multiple stages and separated from each other in a radial direction of the torque converter, the lock-up clutch including an outer hub and an inner hub, the outer hub extending toward the lock-up damper and supporting one of first and second frictional engagement members engageable with each other, the outer hub extending toward a first space formed between the plurality of springs in the radial direction, the inner hub extending toward the engine and supporting the other of the first and second frictional engagement members.

According to another aspect of the disclosure, a torque converter, a lock-up clutch arranged between the torque converter and an engine, and a lock-up damper arranged between the torque converter and the lock-up clutch and connected to the lock-up clutch, the lock-up damper including a first spring arranged at a radially outward side of the torque converter and a second spring arranged at a radially inward side of the torque converter, the lock-up clutch including an outer hub and an inner hub, the outer hub extending from the direction of the engine toward the lock-up damper and supporting one of first and second frictional engagement members engageable with each other, the inner hub being arranged at the radially inward side of the torque converter relative to the outer hub, extending from the direction of the lock-up damper toward the engine, and supporting the other of the first and second frictional engagement members, the outer hub, a portion of which extends toward the lock-up damper, the portion of the outer hub being positioned between the first spring and the second spring in the radial direction of the torque converter.

BRIEF DESCRIPTION OF THE DRAWINGS

The foregoing and additional features and characteristics of this disclosure will become more apparent from the following detailed description considered with the reference to the accompanying drawing, wherein:

The drawing is a cross-sectional view illustrating a configuration of a torque converter apparatus according to an embodiment of this disclosure.

DETAILED DESCRIPTION

A torque converter apparatus 20 according to an embodiment of this disclosure will be described as follows with reference to the drawing. The drawing illustrates a cross-sectional view illustrating a configuration of the torque converter apparatus 20 according to the embodiment.

As illustrated in the drawing, the torque converter apparatus 20 includes a torque converter 2, a lock-up clutch 3 arranged between an engine 1 (referred to as E/N) and the torque converter 2, and a lock-up damper 4 arranged between the lock-up clutch 3 and the torque converter 2. The lock-up damper 4 includes a plurality of springs 4a and 4b. The springs 4a and 4b are arranged at multiple stages while being separated from one another in a radial direction of the torque converter 2. The lock-up clutch 3 includes an outer hub 3a and an inner hub 3b. The outer hub 3a supports first frictional engagement members 3c and extends toward the lock-up damper 4. The inner hub 3b supports second frictional engagement members 3d and extends toward the engine 1. The outer hub 3a extends toward a first space 4e defined between the springs 4a and 4b in the radial direction of the torque converter 2. The first space 4e corresponds to a recessed portion of a drive plate 4c of the lock-up damper 4.

The torque converter 2 includes a pump impeller 2a serving as an input element, a turbine liner 2b serving as an output element, and a stator wheel 2c multiplying torque of the engine 1 transmitted via a fluid between the pump impeller 2a and the turbine liner 2b.

A front cover 6 to which the torque is inputted from the engine 1 is integrally formed with a rear cover 7. An impeller clutch 8 is arranged between the rear cover 7 and the pump impeller 2. The impeller clutch 8 transmits and disconnects a driving force of the engine 1 to and from the pump impeller 2a.

The lock-up clutch 3 is arranged at a radially inward side of the torque converter apparatus 20 or in an intermediate portion in the radial direction of the torque converter 2. The lock-up clutch 3 includes the first frictional engagement members 3c, the second frictional engagement members 3d, and a clutch piston 3e. The first frictional engagement members 3c are supported by the outer hub 3a integrally formed with an inner wall of the front cover 6. The second frictional engagement members 3d are supported by the inner hub 3b and engageable with the first frictional engagement members 3c. The inner hub 3b is connected to the drive plate 4c of the lock-up damper 4 so as to integrally rotate with the drive plate 4c. The clutch piston 3e is arranged between the lock-up clutch 3 and the front cover 6 formed in the vicinity of the engine 1. The clutch piston 3e is formed so as to be movable in an axial direction of the torque converter 2 by means of a pressure (corresponding to a clutch engagement pressure) in a third space 3g defined between the clutch piston 3e and the front cover 6. Thus, the clutch piston 3e is moved by the clutch engagement pressure in the axial direction to thereby enable the first frictional engagement members 3c to engage with the second frictional engagement members 3d. The aforementioned clutch engagement pressure is supplied to the independent oil passage 5 through a hollow oil passage 14a of an output shaft 14 of the torque converter 2. The lock-up clutch 3 transmits and disconnects the driving force between the engine 1 and the output shaft 14. In addition, the independent oil passage 5 through which the clutch engagement pressure is supplied to the lock-up clutch 3 is arranged separately from other oil passages such as an oil passage through which a pressure is supplied to an inner side of the torque converter 2.

The lock-up damper 4 includes the drive plate 4c, a driven plate 4d, and the plurality of springs 4a and 4b serving as first and second springs. The torque of the engine 1 is transmitted to the drive plate 4c to which the inner hub 3b is connected. The driven plate 4d is connected to a turbine hub 17 spline-fitted to the output shaft 14. The spring 4a arranged in the vicinity of a large diameter portion of the lock-up damper 4 will be hereinafter referred to as a large-diameter-side spring 4a. Meanwhile, the spring 4b arranged in the vicinity of a small-diameter portion of the lock-up damper 4 will be referred to as a small-diameter-side spring 4b. The large-diameter-side spring 4a and the small-diameter-side spring 4b are arranged between the drive plate 4c and the driven plate 4d so as to transmit the torque therebetween.

The lock-up damper 4 is arranged on a torque transmission route between the lock-up clutch 3 and the output shaft 14. When the lock-up clutch 3 is in an engaged state, the lock-up damper 4 absorbs fluctuations or vibrations of the torque transmitted from the engine 1 via the lock-up clutch 3 to a transmission. The large-diameter-side spring 4a is designed to have a diameter larger than a diameter of the small-diameter-side spring 4b so that a noise absorbing ability of the lock-up damper 4 increases and so that the first space 4e for arranging therein the outer hub 3a is surely secured.

The drive plate 4c is positioned at least between the large-diameter-side spring 4a and the small-diameter-side spring 4b in the radial direction of the torque converter 2. An end of the outer hub 3a of the lock-up clutch 3 extends toward the recessed portion (first space) 4e formed in an intermediate portion of the drive plate 4c. That is, a shape of one of components of the lock-up damper 4 is utilized for positioning the outer hub 3a.

In addition, the clutch piston 3e included in the lock-up clutch 3 is curved toward the lock-up damper 4 so as to form a second space 3f at an inner portion. The inner portion of the clutch piston 3e is located in the direction of the lock-up damper 4. An end of the inner hub 3b protrudes toward the second space 3f. In other words, a shape of one of components of the lock-up clutch 3 is utilized for positioning the inner hub 3b. Further, the end of the inner hub 3b protrudes toward the third space 3g defined between the clutch piston 3e and the front cover 6.

Operation of the torque converter apparatus 20 will be explained as follows. When the lock-up clutch 3 is brought into the engaged state, the clutch engagement pressure pressing the clutch piston 3e in a right direction seen in the drawing is supplied from the hollow oil passage 14a through the independent oil passage 5 to the lock-up clutch 3. A pressing force of the clutch piston 3e, which is the clutch engagement pressure, is applied to the first frictional engagement members 3c and the second frictional engagement members 3d; therefore, the first frictional engagement members 3c are engaged with the second frictional engagement members 3d. Then, the torque is inputted or transmitted to the lock-up damper 4 by the lock-up clutch 3. In a case where the torque varies or a case where a relative rotation occurs between the engine 1 and the output shaft 14 that corresponds to an input shaft of the transmission, the drive plate 4c and the driven plate 4d of the lock-up damper 4 rotate relative to each other. Accordingly, the large-diameter-side spring 4a and the small-diameter-side spring 4b arranged at multiple stages and separated from one another in the radial direction of the torque converter 2 operate in a stepwise manner to absorb the fluctuations or vibrations of the torque. The large-diameter-side spring 4a and the small-diameter-side spring 4b are compressible and extensible along a rotating direction of the drive plate 4c and the driven plate 4d. As a result, the torque is transmitted from the output shaft 14 to the transmission via the lock-up clutch 3, the lock-up damper 4, and the turbine hub 17. In addition, alternatively, the plurality of springs 4a and 4b (the large-diameter-side spring 4a and the small-diameter-side spring 4b) may be arranged in a window or a hole that is formed in the drive plate 4c and the driven plate 4c instead of the recessed portion 4e formed at the drive plate 4c. Further alternatively, the plurality of springs 4a and 4b may be configured by a plurality of springs arranged in a circumferential direction of the torque converter 2. Moreover, the plurality of springs 4a and 4b appropriately functions in a stepwise manner depending on different relative angles between the drive plate 4c and the driven plate 4d.

Effects of the torque converter apparatus 20 will be described as follows. In the lock-up clutch 3, the outer hub 3a extends toward the first space (recessed portion) 4e of the drive plate 4c, formed between the large-diameter-side spring 4a and the small-diameter-side spring 4b that are included in the lock-up damper 4 in the radial direction of the torque converter 2. Thus, the first space 4e that is a dead space is effectively utilized to reduce the length of the lock-up clutch 3 in the axial and radial directions accordingly. In addition, the length of the torque converter apparatus 20 in the axial and radial directions is reduced. As a result, a whole size of the torque converter apparatus 20 is minimized.

In addition, the end of the inner hub 3b protrudes toward the second space 3f defined between the front cover 6 and the clutch piston 3e of the lock-up clutch 3. Thus, the second space 3f that is a dead space is effectively utilized; therefore, the length of the lock-up clutch 3 in the axial and radial directions is further reduced. In addition, the length of the torque converter apparatus 20 in the axial and radial directions is reduced. Consequently, the whole size of the torque converter apparatus 20 is further minimized.

The torque converter apparatus 20 according to the embodiment may be applied to a torque converter apparatus provided with a lock-up damper including a plurality of springs that are arranged at multiple stages and separated from one another in a radial direction of the torque converter apparatus. Further, the torque converter apparatus 20 according to the embodiment may be utilized in a vehicle provided with a torque converter apparatus including a lock-up clutch having an independent oil passage.

As described above, the first space 4e defined between the large-diameter-side spring 4a and the small-diameter-side spring 4b of the lock-up damper 4 in the radial direction of the torque converter 2 is effectively utilized to project the outer hub 3a of the lock-up clutch 3 toward the first space 4e. Accordingly, the length of the torque converter 2 in the axial and radial directions is reduced, thereby minimizing the whole size of the torque converter 2. Consequently, the torque converter 2 having the minimized size increases installability relative to the vehicle.

According to the aforementioned embodiment, one of the plurality of springs 4a and 4b arranged at the large-diameter portion of the lock-up damper 4 has the diameter larger than the diameter of the other of the plurality of springs 4a and 4b arranged at the small-diameter portion of the lock-up damper 4.

Accordingly, the first space 4e for therein arranging the inner hub 3b of the lock-up clutch 3 is surely obtained.

According to the aforementioned embodiment, the lock-up damper 4 includes the drive plate 4c provided at least between the plurality of springs 4a and 4b in the radial direction. The end of the outer hub 3a projects toward the recessed portion 4e formed at the drive plate 4c.

Accordingly, the shape of one of the components of the lock-up damper 4 is utilized to thereby position the outer hub 3a of the lock-up clutch 3 in the recessed portion 4e.

According to the aforementioned embodiment, the clutch piston 3e included in the lock-up clutch 3 is curved toward the lock-up damper 4 to form the second space 3f in the direction of the lock-up damper 4. The end of the inner hub 3b projects toward the second space 3f.

Accordingly, the shape of one of the components of the lock-up clutch 3 is utilized to thereby position the inner hub 3b of the lock-up clutch 3 in the second space 3f.

According to the aforementioned embodiment, the clutch piston 3e included in the lock-up clutch 3 is arranged between the lock-up clutch 3 and the front cover 6 formed in the vicinity of the engine 1. The clutch piston 3e is formed to be movable in the axial direction of the torque converter 2 by the pressure in the third space 3g defined between the clutch piston 3e and the front cover 6. The end of the inner hub 3b protrudes toward the third space 3g defined between the clutch piston 3e and the front cover 6.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque converter apparatus, comprising:
   a torque converter;
   a lock-up clutch arranged between the torque converter and an engine, the lock-up clutch and the torque converter being arranged along an axial direction;
   a lock-up damper arranged between the torque converter and the lock-up clutch and connected to the lock-up clutch, the lock-up damper including a plurality of springs arranged at multiple stages and separated from each other in a radial direction of the torque converter,
   the lock-up clutch including an outer hub and an inner hub, the outer hub extending toward the lock-up damper and supporting one of first and second frictional engagement members engageable with each other, the outer hub extending toward a first space formed between the plurality of springs in the radial direction, the inner hub extending toward the engine and supporting the other of the first and second frictional engagement members,
   wherein a first one of the plurality of springs possesses a larger diameter than a second one of the plurality of springs positioned radially inwardly of the first one of the plurality of springs,
   the second one of the plurality of springs being positioned between the lock-up clutch and the torque converter and aligned in the axial direction with the torque converter, and
   the entirety of the second one of the plurality of springs being positioned: (i) radially inward of the outer hub, and (ii) radially outward of the inner hub.

2. The torque converter apparatus according to claim 1, wherein the lock-up damper includes a drive plate provided at least between the plurality of springs in the radial direction, and an end of the outer hub projects toward a recessed portion formed at the drive plate.

3. The torque converter apparatus according to claim 1, wherein a clutch piston included in the lock-up clutch is curved toward the lock-up damper to form a second space in the direction of the lock-up damper, and an end of the inner hub projects toward the second space.

4. The torque converter apparatus according to claim 2, wherein a clutch piston included in the lock-up clutch is curved toward the lock-up damper to form a second space in the direction of the lock-up damper, and an end of the inner hub projects toward the second space.

5. A torque converter apparatus, comprising:
   a torque converter;
   a lock-up clutch arranged between the torque converter and an engine, the lock-up clutch and the torque converter being arranged along an axial direction; and
   a lock-up damper arranged between the torque converter and the lock-up clutch and connected to the lock-up clutch, the lock-up damper including a first spring arranged at a radially outward side of the torque converter and a second spring arranged at a radially inward side of the torque converter, the first spring possessing a diameter larger than the second spring,
   the lock-up clutch including an outer hub and an inner hub, the outer hub extending away from the engine toward the lock-up damper and supporting one of first and second frictional engagement members engageable with each other, the inner hub being arranged at the radially inward side of the torque converter relative to the outer hub and extending away from the lock-up damper toward the engine, the inner hub supporting the other of the first and second frictional engagement members, the outer hub, a portion of which extends toward the lock-up damper, the portion of the outer hub being positioned between the first spring and the second spring in the radial direction of the torque converter, the second spring being positioned between the lock-up clutch and the torque converter and aligned in the axial direction with the torque converter, and the entirety of the second spring being positioned: (i) radially inward of the outer hub, and (ii) radially outward of the inner hub.

6. The torque converter apparatus according to claim 5, wherein the lock-up damper includes a drive plate between the first spring and the second spring in the radial direction of the torque converter, and an end of the outer hub projects toward a recessed portion formed at the drive plate.

7. The torque converter apparatus according to claim 6, wherein a clutch piston included in the lock-up clutch is arranged between the lock-up clutch and a front cover formed in the vicinity of the engine, the clutch piston being formed to be movable in an axial direction of the torque converter by a pressure in a third space defined between the clutch piston and the front cover, and an end of the inner hub protrudes toward the third space defined between the clutch piston and the front cover.

* * * * *